United States Patent
Chung et al.

(10) Patent No.: US 7,050,658 B2
(45) Date of Patent: May 23, 2006

(54) METHOD AND APPARATUS FOR REDUCING SYSTEM DETERIORATION CAUSED BY POLARIZATION EFFECTS

(75) Inventors: Yun Chur Chung, Daejeon (KR); Jun Haeng Lee, Daejeon (KR); Chun Ju Youn, Gyeonggi-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 166 days.

(21) Appl. No.: 10/802,862

(22) Filed: Mar. 18, 2004

(65) Prior Publication Data

US 2004/0202396 A1    Oct. 14, 2004

(30) Foreign Application Priority Data

Apr. 8, 2003    (KR) .................. 10-2003-0021893

(51) Int. Cl.
| | |
|---|---|
| G02F 1/01 | (2006.01) |
| G02F 1/35 | (2006.01) |
| H04J 14/06 | (2006.01) |
| H04J 14/02 | (2006.01) |
| H04B 10/12 | (2006.01) |
| H01S 3/00 | (2006.01) |

(52) U.S. Cl. ................. 385/1; 385/2; 385/3; 398/65; 398/81; 398/147; 398/148; 359/337.5

(58) Field of Classification Search ............ 385/1–3; 398/43, 44, 65, 79, 82, 81, 147; 359/337.5
See application file for complete search history.

(56) References Cited

U.S. PATENT DOCUMENTS

| 5,311,346 A | 5/1994 | Haas et al. |
| 6,583,903 B1* | 6/2003 | Way et al. ............... 398/152 |
| 2003/0011839 A1* | 1/2003 | Liang et al. ............. 359/124 |

FOREIGN PATENT DOCUMENTS

WO    WO 01/65733 A1    9/2001

* cited by examiner

*Primary Examiner*—Brian Healy
*Assistant Examiner*—Jerry Martin Blevins
(74) *Attorney, Agent, or Firm*—Oliff & Berridge, PLC

(57) ABSTRACT

A method and apparatus for minimizing system deterioration caused by polarization effects (e.g., a polarization-dependent gain (PDG), a polarization-dependent loss (PDL), and a polarization mode dispersion (PMD)). The apparatus performs a signal modulation process to enable one bit to simultaneously contain two orthogonal polarization components, resulting in a minimum DOP (Degree Of Polarization). If a signal undergoes the PMD, the apparatus converts an NRZ (Non Return to Zero) signal into an RZ (Return to Zero) signal, resulting in minimum inter-symbol interference caused by the PMD. The apparatus can improve a performance of an optical signal during the PMD operation, whereas a conventional PMD compensation technique has been designed to remove system deterioration caused by only the PMD.

9 Claims, 5 Drawing Sheets

METHOD AND APPARATUS FOR REDUCING SYSTEM DETERIORATION CAUSED BY POLARIZATION EFFECTS

BACKGROUND OF THE INVENTION

1. Field of the Invention

The present invention relates to an optical communication method and apparatus, and more particularly to a method and apparatus for reducing system deterioration caused by polarization effects encountered in an optical communication system.

2. Description of the Related Art

Following the current trend of rapidly increasing a transfer rate and a transmission distance of an optical communication system, a variety of phenomena encountered by polarization effects have recently been proposed as principal factors in deterioration of system performance. For example, an optical signal-to-noise ratio (SNR) is degraded by a PDG (Polarization-Dependent Gain) and a PDL (Polarization-Dependent Loss) in a long-distance optical communication network using an EDFA (Erbium-Doped Fiber Amplifier), resulting in deterioration of system performance. The aforementioned problem can be considerably improved by reducing a DOP (Degree Of Polarization) of a transmission optical signal, such that there has generally been proposed a method for controlling a transmission end to perform a scrambling process on a signal's polarization. However, the polarization scrambling process allows the signal's polarization state to be uniformly distributed in the form of two orthogonal polarization states, resulting in the increased influence of a PMD (Polarization-Mode Dispersion). Therefore, not only the polarization scrambling process but also the appropriate PMD operation must be carried out to guarantee a performance of a high-speed and long-distance optical communication system.

In order to solve the aforementioned problems, a representative method for controlling a transmission end to apply a signal to either one of reference polarization axes of an optical path so as to compensate for the PMD has been described in PCT International Application Publication No. WO 01/65733, which is hereby incorporated by reference. However, the aforementioned PCT International Application WO 01/65733 has been designed to reduce only the influence of the PMD, such that it has difficulty in actively solving the optical signal deterioration problem caused by the polarization effects. In conclusion, if the influence of the PMD can be reduced and a signal's performance can be improved, the deterioration problem of the optical signal can also be effectively improved.

SUMMARY OF THE INVENTION

Therefore, the present invention has been made in view of the above problems, and it is an object of the present invention to provide a method and apparatus for reducing system deterioration so that it can acquire a receiver sensitivity gain without encountering the attenuation of an optical signal's intensity caused by a polarization effect such as a PMD (Polarization Mode Dispersion).

It is another object of the present invention to provide a method and apparatus for reducing system deterioration so that it can effectively prevent a DOP (Degree Of Polarization) from being increased by the PMD, resulting in the maintenance of a low DOP.

In accordance with one aspect of the present invention, the above and other objects can be accomplished by the provision of a method for reducing system deterioration caused by polarization effects when an optical signal is transmitted to a destination using an optical transmission system having an optical path comprised of fast and slow polarization axes, comprising the steps of: a) controlling a transmission end to divide the optical signal into two polarization components orthogonal to each other within one bit before transmitting the optical signal so that a PMD (Polarization Mode Dispersion) can be compensated in the optical path; and b) applying one polarization component of the two orthogonal polarization components to the fast polarization axis of the optical path, applying the other polarization component of the two orthogonal polarization components to the slow polarization axis of the optical path, and reducing the influence of the PMD using a predetermined effect indicative of a pulse width reduction caused by the PMD.

Preferably, the step (a) includes the steps of: a1) controlling a first intensity modulator driven by a data signal to modulate an output signal of a light source into an NRZ (Non Return to Zero) signal; a2) controlling a second intensity modulator driven by a clock frequency signal synchronized with the data signal to modulate the NRZ signal into an RZ (Return to Zero) signal; and a3) applying the RZ signal to a component inducing a DGD (Differential Group Delay) corresponding to 30~70% of a period of the data signal at an angle of 45° with respect to a reference polarization axis so that only one polarization component is delayed by 30~70% of the data signal's period.

Preferably, the component inducing the DGD at the step (a3) is indicative of a PMF (Polarization Maintaining Fiber).

Preferably, the step (a) includes the steps of: a1) controlling an intensity modulator driven by a data signal to modulate an output signal of a light source into an NRZ (Non Return to Zero) signal; and a2) controlling a polarization modulator driven by a clock frequency signal synchronized with the data signal to return the NRZ signal to a signal polarized by a predetermined ratio 30~70% within one bit, whereby the output optical signal of the transmission end can simultaneously contain two polarization components within one bit.

Preferably, the step (a) includes the step of: performing a signal modulation process, such that one sub-polarization component contained in two orthogonal polarization components (each composed of two sub-polarization components) between nearby bits has the same phase as the other sub-polarization component, and a remaining sub-polarization component contained in the two orthogonal polarization components between nearby bits has a phase opposite to that of a counterpart sub-polarization component of the remaining sub-polarization component.

Preferably, the step (a) includes the steps of: a1) controlling a first intensity modulator driven by a data signal to modulate an output signal of a light source into an NRZ (Non Return to Zero) signal; a2) controlling a second intensity modulator driven by a clock frequency signal synchronized with the data signal to modulate the NRZ signal into an RZ (Return to Zero) signal; a3) controlling a polarization modulator driven by a square or sinusoidal wave corresponding to a half the clock frequency signal to change a polarization direction at intervals of one bit so that individual nearby bits of the RZ signal have polarization states orthogonal to each other; and a4) applying individual bits of the RZ signal being polarization-modulated for every bit generated at the step (a3) to a component inducing a DGD (Differential Group Delay) corresponding to 30~70% of a period of the data signal at an angle of 45° with respect to a reference polarization axis, dividing each bit into two polarization components, and delaying only one polarization component of the two polarization components by 30~70% of the data signal period, whereby the two polarization components are simultaneously contained in just one bit, one of the two polarization components has the same phase as that of a nearby bit, and the other one has a phase opposite to that of the nearby bit.

In accordance with another aspect of the present invention, there is provided an apparatus for reducing system deterioration caused by polarization effects, comprising: a transmission end, wherein the transmission end includes: a light source; a first intensity modulator driven by a data signal, for modulating an output signal of the light source into an NRZ (Non Return to Zero) signal; a second intensity modulator driven by a clock frequency signal synchronized with the data signal, for modulating the NRZ signal received from the first intensity modulator into an RZ (Return to Zero) signal; a polarization modulator driven by a signal having a frequency equal to a half a frequency of the clock frequency signal, for modulating the RZ signal received from the second intensity modulator into another signal so that individual nearby bits have polarization components orthogonal to each other; a PMF (Polarization Maintaining Fiber) for controlling a polarization direction of the polarization-modulated signal to be equal to an angle of 45° on the basis of its own polarization axis, and generating a difference between group velocities of two orthogonal polarization components; and a transmission end polarization controller positioned between the polarization modulator and the PMF, for controlling the polarization direction of the polarization-modulated signal.

In accordance with yet another aspect of the present invention, there is provided an apparatus for reducing system deterioration caused by polarization effects, comprising: a transmission end, wherein the transmission end includes: a light source; a first intensity modulator driven by a data signal, for modulating an output signal of the light source into an NRZ (Non Return to Zero) signal; a second intensity modulator driven by a clock frequency signal synchronized with the data signal, for modulating the NRZ signal received from the first intensity modulator into an RZ (Return to Zero) signal; a PMF (Polarization Maintaining Fiber) for controlling a polarization direction of the polarization-modulated signal to be equal to an angle of 45° on the basis of its own polarization axis, and generating a difference between group velocities of two orthogonal polarization components; and a transmission end polarization controller positioned between the second intensity modulator and the PMF, for controlling a polarization direction of the modulated RZ signal.

In accordance with yet another aspect of the present invention, there is provided an apparatus for reducing system deterioration caused by polarization effects, comprising: a transmission end, wherein the transmission end includes: a light source; a first intensity modulator driven by a data signal, for modulating an output signal of the light source into an NRZ (Non Return to Zero) signal; a polarization modulator driven by a clock frequency signal synchronized with the data signal, for performing a polarization modulation process so that the modulated NRZ signal can simultaneously contain two orthogonal polarization components within one bit; and a transmission end polarization controller for controlling a polarization direction of the polarization-modulated NRZ signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
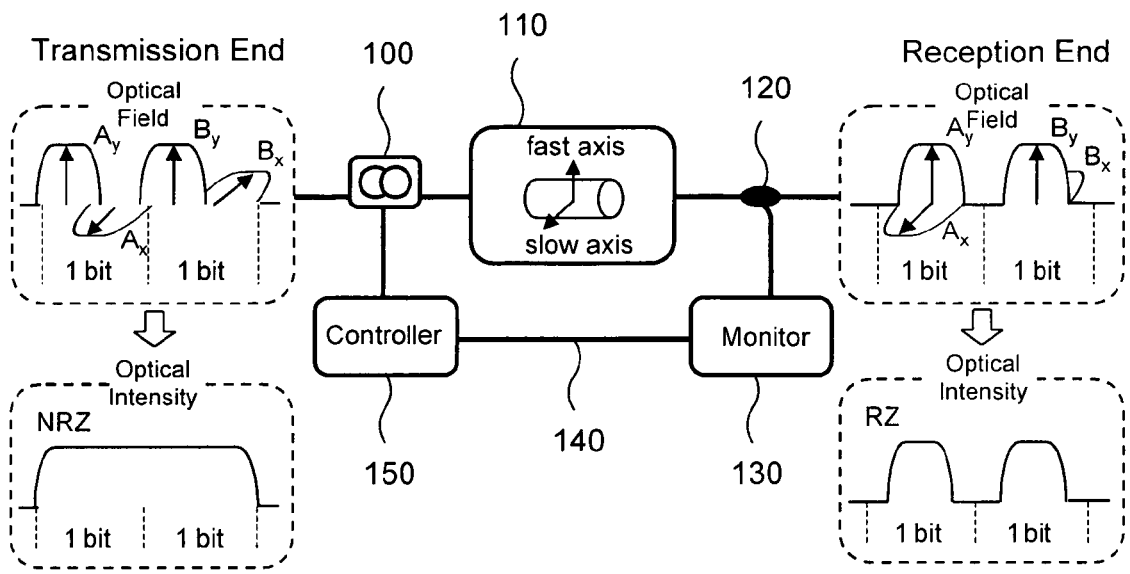
FIG. 1 is a conceptual diagram illustrating the principle of a method for reducing system deterioration caused by all the polarization effects (e.g., PMD, PDG, and PDL, etc.) in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a conceptual diagram illustrating the principle of a method for reducing system deterioration caused by all the polarization effects (e.g., PMD, PDG, and PDL, etc.) in accordance with a preferred embodiment of the present invention. According to the method of FIG. 1, a transmission end divides a polarization part of an NRZ (Non Return to Zero) signal into two parts orthogonal to each other within one bit, resulting in a predetermined polarization state where $A_x$ is orthogonal to $A_y$, and $B_x$ is also orthogonal to $B_y$. Also, the method of FIG. 1 controls phases of $A_x$ and $B_x$ to be opposed to each other, such that it can prevent a signal DOP from being increased again by the PMD. In this case, provided that the phase of $A_x$ is equal to the phase of $B_x$, the PMD is carried out while the optical signal runs on an optical path 110 having the PMD problem, a part formed by the sum of $A_x$ and $A_y$, and the other part formed by the sum of $B_x$ and $B_y$, have the same polarization parts, respectively, resulting in an increased signal DOP. However, the inventive method controls the overlapped parts formed by the PMD to have polarizations orthogonal to each other, such that it can effectively prevent the DOP from being increased. Also, the present invention uses an automatic polarization controller 100 to avoid mutual interference between bits generated by the PMD, such that the $A_x$ (or $B_x$) component contained in an optical signal generated from the transmission end is applied to a slow polarization axis of an optical transmission path, and the $A_y$ (or $B_y$) component contained in the same optical signal is applied to a fast polarization axis of the optical transmission path. Therefore, if an optical signal undergoes the PMD on the optical transmission path, the $A_x$ (or $B_x$) component is overlapped with the $A_y$ (or $B_y$) component, so that the NRZ signal is converted into an RZ (Return to Zero) signal. In this way, the aforementioned method avoids mutual interference between bits caused by the PMD, and converts the NRZ signal into the RZ signal, such that it can improve the receiver sensitivity when the optical signal undergoes the PMD. In the meantime, the optical signal received over the optical path 110 is partially branched by an optical tap 120 such that the branched result data is monitored by a monitor 130. The monitored result data is transmitted to the controller 150 over a control channel 140, such that the automatic polarization controller 100 is controlled by the controller 150 according to a feed-back control scheme.

Figure 2:
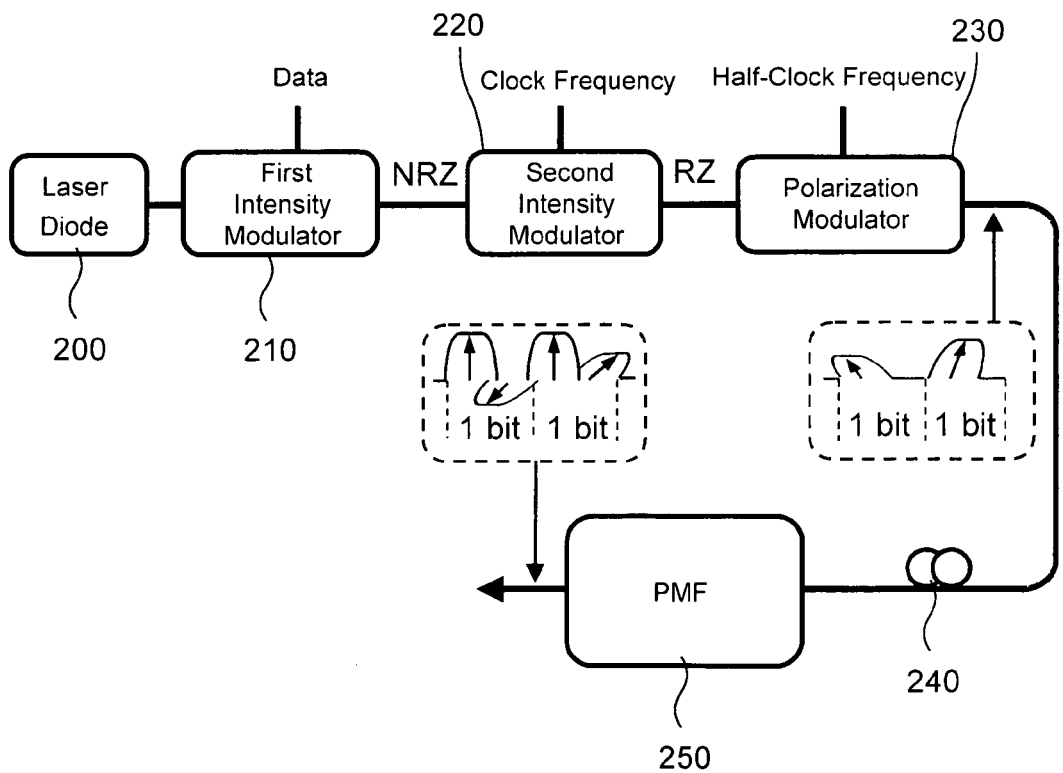
FIG. 2 is a block diagram illustrating an apparatus of the present invention (particularly, a transmission end) in accordance with a preferred embodiment of the present invention.

FIG. 2 is a block diagram illustrating an apparatus of the present invention (particularly, a transmission end) in accordance with a preferred embodiment of the present invention. Referring to FIG. 2, a first intensity modulator 210 driven by a data signal modulates an output signal of a laser diode 200 acting as a light source into an NRZ signal. The modulated signal generated from the first intensity modulator 210 is re-modulated by a second intensity modulator 220 driven by a clock frequency signal synchronized with the data signal, resulting in an RZ signal. This RZ signal is modulated by a polarization modulator 230 driven by a signal having a half-clock frequency so that individual nearby bits have polarizations orthogonal to each other. A transmission end polarization controller 240 fixes a polarization direction of the polarization-modulated signal to a predetermined angle of 45° with respect to a polarization axis of a PMF (Polarization Maintaining Fiber) 250, and then the polarization-modulated signal is applied to the PMF 250. The PMF 250 generates a difference of group velocities between two polarization axes, such that each bit is divided into two polarization components and an optical signal created by delaying only one of the two polarization components by the length of a half bit can be acquired as an output signal of the transmission end.

Figure 3:
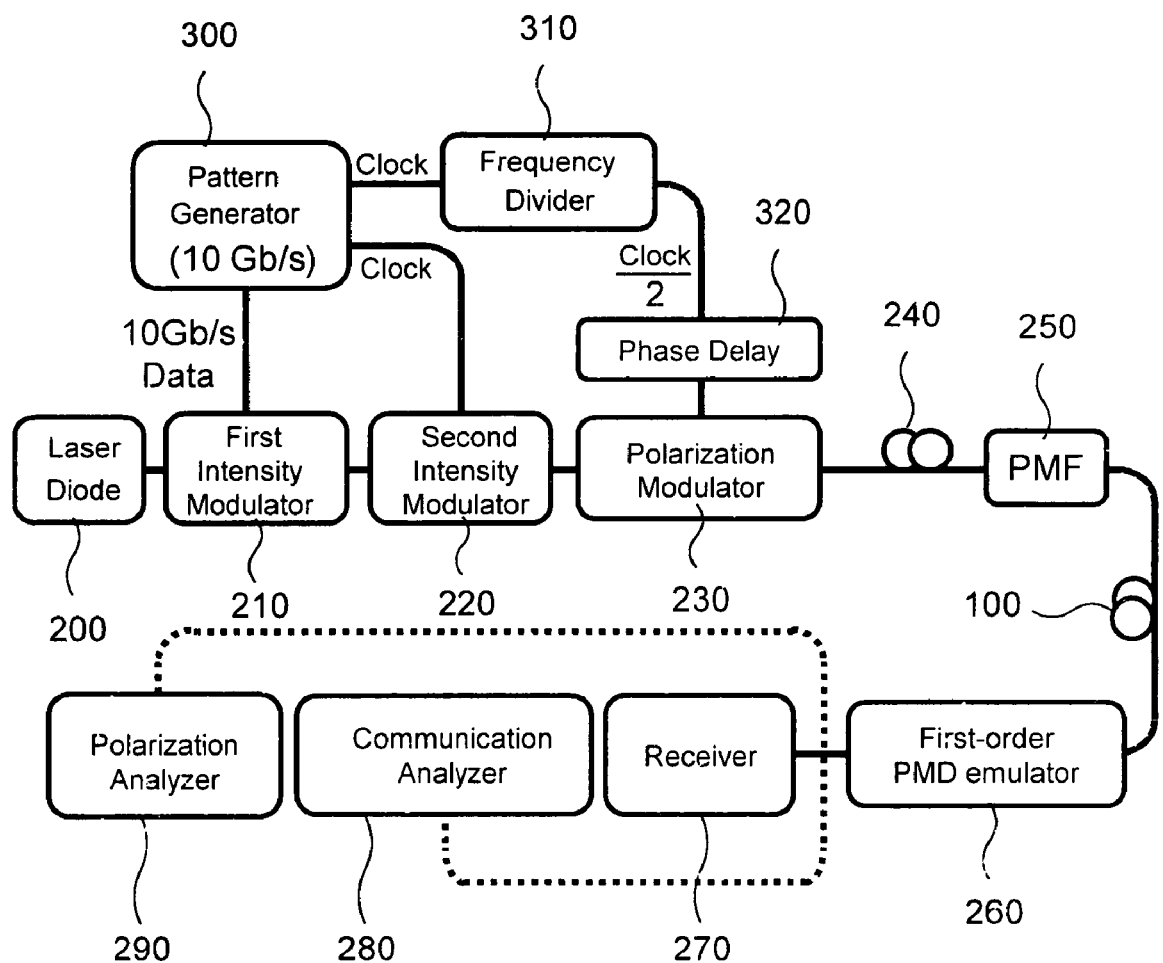
FIG. 3 is a block diagram illustrating an experimental device for verifying the validity of a method for use in the present invention.

FIG. 3 is a block diagram illustrating an experimental device for verifying the validity of a method for use in the present invention. In the drawings, the same or similar elements are denoted by the same reference numerals even though they are depicted in different drawings. Referring to FIG. 3, the experimental device includes the transmission end shown in FIG. 2, and further includes a pattern generator 300, a frequency divider 310, and a phase delay 320, so that it can generate a variety of signals (i.e., a data signal, a clock frequency signal, and a half-clock frequency signal) to operate the first and second intensity modulators 210 and 220 and the polarization modulator 230. Furthermore, the device shown in FIG. 3 further includes a first-order PMD emulator 260 for copying the optical path 110 having the first-order PMD shown in FIG. 1, transmits an output signal of the first-order PMD emulator 260 to a receiver 270, and analyzes the output signal of the first-order PMD emulator 260 using a communication analyzer 280 and a polarization analyzer 290.

Operations of the experimental device shown in FIG. 3 will hereinafter be described in detail. The first intensity modulator 210 modulates an output signal of the laser diode 200 into an NRZ signal of 10 Gb/s (i.e., a Pseudo Random Binary Signal (PRBS) of $2^{31}-1$). The second intensity modulator 220 modulates the 10 Gb/s NRZ signal into an RZ signal. This RZ signal is modulated by a $LiNbO_3$ polarization modulator 230 such that individual nearby bits can have polarizations orthogonal to each other. The experimental device of FIG. 3 uses a $LiNbO_3$ external modulator as the first and second intensity modulators 210 and 220. The polarization-modulated signal is applied to the PMF 250 at an angle of 45° over the transmission end polarization controller 240, such that each bit is divided into two polarization components and only one polarization component between the two polarization components is delayed by a half bit. In order to allow receiver sensitivity of the signal modulated by the above method to be equal to a general NRZ signal, the device of FIG. 3 sets a DGD (Differential Group Delay) value of the PMF 250 to a predetermined value of 34 ps. The optical signal generated from the PMF 250 is transmitted to a polarization controller 100 for setting a polarization direction of the optical signal to a polarization axis of the first-order PMD emulator 260 needed to copy out the optical path, and is then applied to the first-order PMD emulator 260. The optical signal generated from the first-order PMD emulator 260 is transmitted to the receiver 270, and is analyzed by the communication analyzer 280 and the polarization analyzer 290. In this way, in the case where the first-order PMD operation is performed on the optical signal, receiver sensitivity (measured in the case of a bit error rate $10^{-9}$) and DOP (Degree Of Polarization) information of the optical signal are measured as shown in FIGS. 4 to 6.

Figure 4:
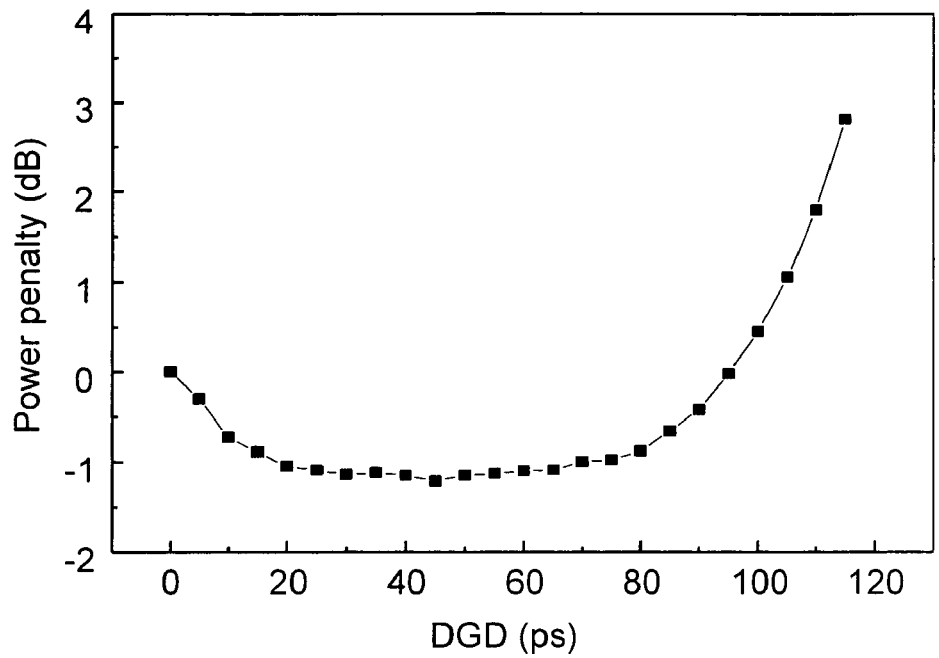
FIG. 4 is a graph illustrating receiver sensitivities measured by continuously changing a DGD (Differential Group Delay) value to another value in the experimental device of FIG. 3.

FIG. 4 is a graph illustrating receiver sensitivities measured by continuously changing a DGD (Differential Group Delay) value in the range from 0 ps to 120 ps. In the case where the DGD value is less than a predetermined value of 100 ps indicative of one period of the 10 Gb/s signal, receiver sensitivity can be increased to a maximum value of 1.3 dB because the NRZ signal is converted into the RZ signal during the above period of the 10 Gb/s signal.

Figure 5:
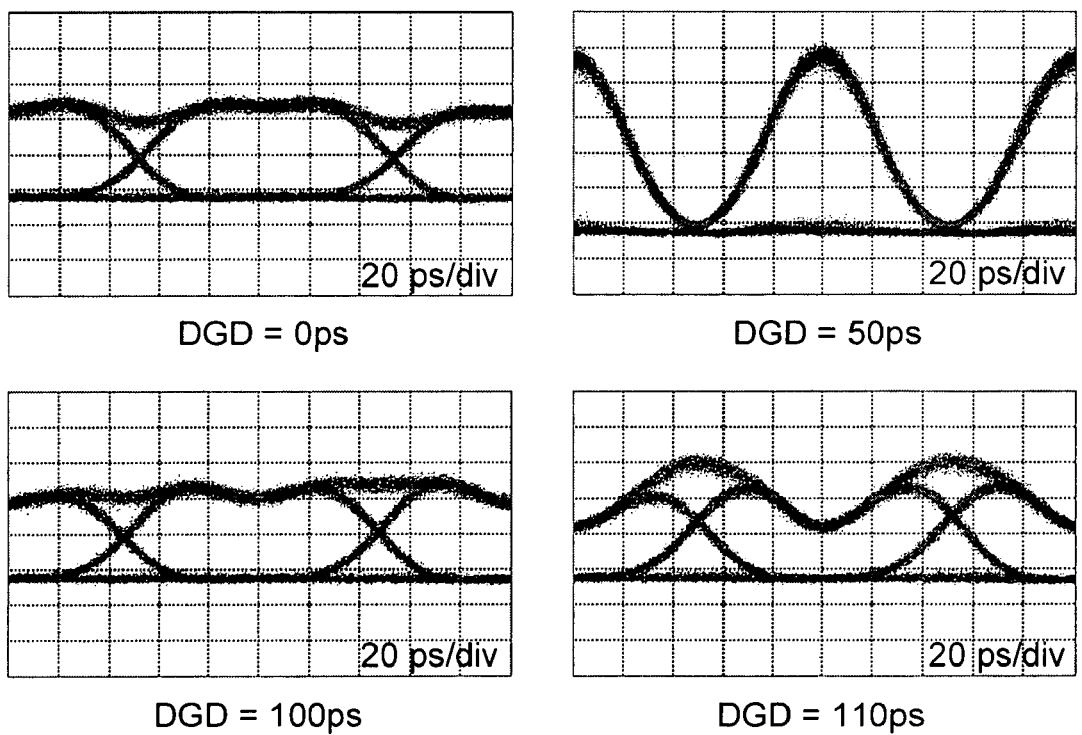
FIG. 5 is a graph illustrating eye shapes varying with a variety of DGD values in the experimental device of FIG. 3.

FIG. 5 is a graph illustrating eye shapes varying with a variety of DGD values for use in the experimental device of FIG. 3. As shown in FIG. 5, if the DGD value is set to a predetermined value of 0 ps, it can be seen that the signal's eye shape is almost equal to that of a general NRZ signal. However, if the DGD value is set to 50 ps, the signal is converted into the RZ signal, such that the signal's receiver sensitivity can be improved by the PMD. If the DGD value is higher than 100 ps, the signal's eye is gradually closed and mutual interference between bits unavoidably occurs, resulting in deterioration of receiver sensitivity.

Figure 6:
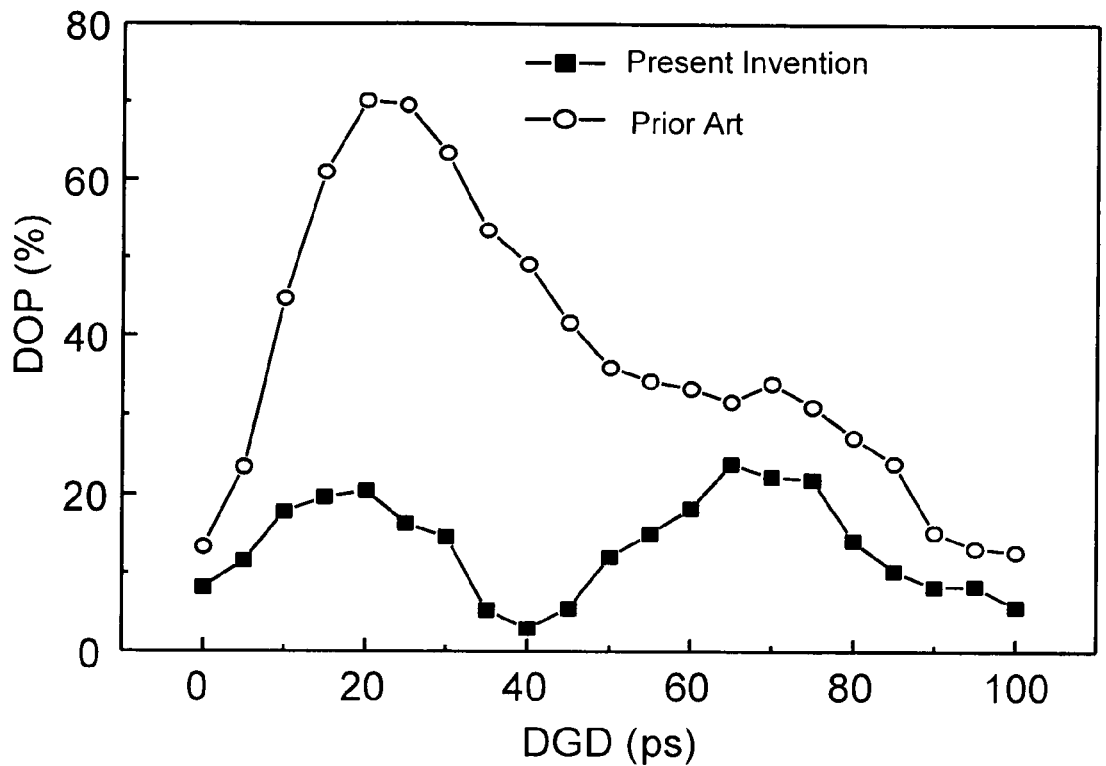
FIG. 6 is a graph illustrating DOP values varying with the DGD values in the experimental device of FIG. 3.

FIG. 6 is a graph illustrating DOP (Degree Of Polarization) values varying with the DGD values for use in the experimental device of FIG. 3. In order to compare the method of the present invention with the conventional polarization scrambling method, the present invention measures a DOP varying with the PMD in regard to even a polarization scrambling method for use with a synchronized clock frequency. Referring to FIG. 6, in the case of using the conventional polarization scrambling method, the higher the DGD value, the higher the DOP value within a maximum range of 70%. In more detail, two polarization components divided by the scrambling method are combined with each other while experiencing the PMD, resulting in one polarization component, so that the higher the DGD value, the higher the DOP value within a maximum range of 70%. However, in the case of using the method of the present invention, a signal's DOP value can be maintained within a maximum range of 25% irrespective of the DGD value.

Figure 7:
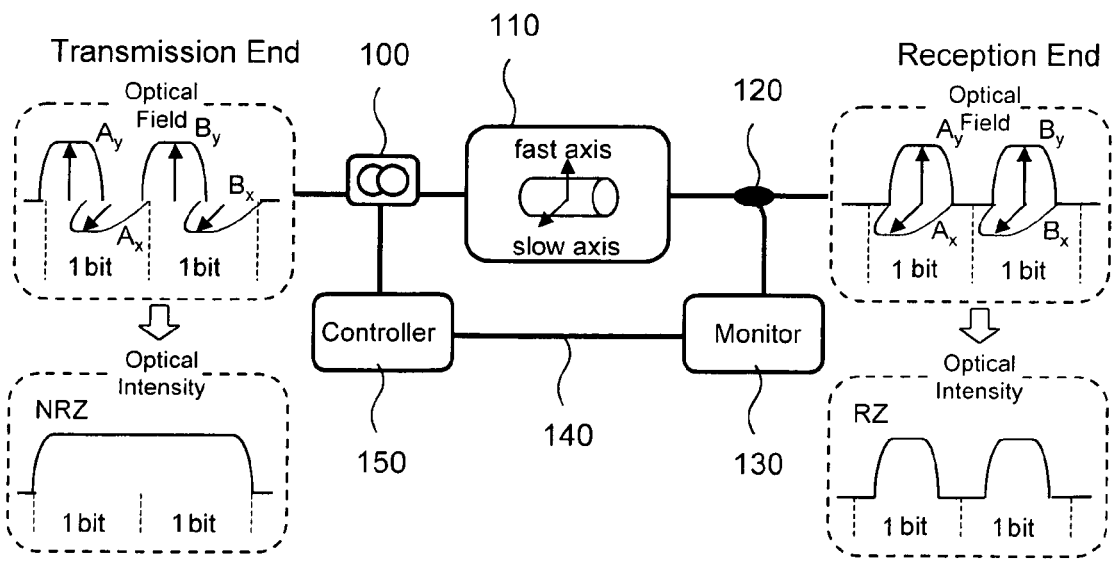
FIG. 7 is a conceptual diagram illustrating the principle of an inventive method for simplifying a configuration of the transmission end so as to compensate for only the PMD in accordance with another preferred embodiment of the present invention.

FIG. 7 is a conceptual diagram illustrating the principle of an inventive method for simplifying the transmission end so as to compensate for only the PMD in accordance with another preferred embodiment of the present invention. Internal components of FIG. 7 are almost equal to those of FIG. 1 except for one matter where the $A_x$ phase is equal to the $B_x$ phase. Typically, if the length of the optical path is not excessively long, an optical signal-to-noise ratio (SNR) reduction effect caused by a PDG (Polarization-Dependent gain) and a PDL (Polarization-Dependent loss) is negligible. In this case, system deterioration caused by the PMD is the most serious problem inducing the limitations in an overall system performance. Provided that the $A_x$ phase is controlled to be equal to the $B_x$ phase as shown in FIG. 7, the transmission end may be simplified. Also, the device of FIG. 7 further installs an automatic polarization controller 100 to a predetermined position next to the transmission end so as to remove mutual interference between bits caused by the PMD, such that the $A_x$ (or $B_x$) component is applied to a slow polarization axis of the optical transmission path, and the $A_y$ (or $B_y$) component is applied to a fast polarization axis of the optical transmission path.

Figure 8:
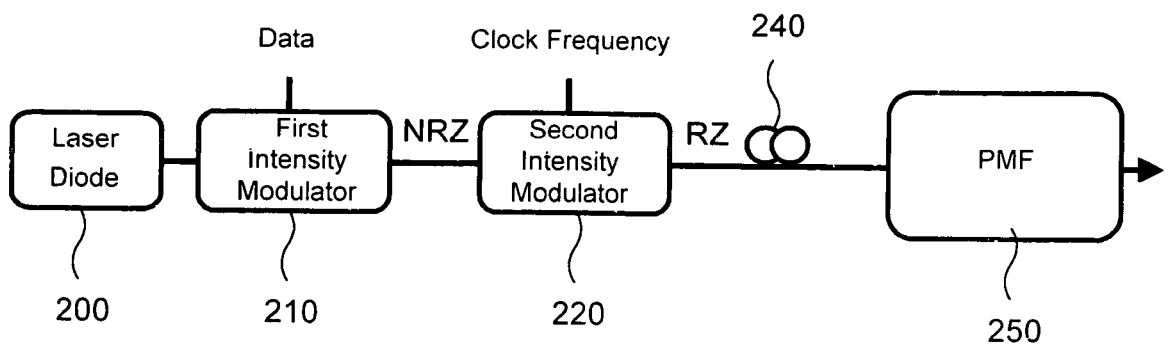
FIG. 8 is a block diagram illustrating a device for implementing the method shown in FIG. 7 in accordance with another preferred embodiment of the present invention.

FIG. 8 is a block diagram illustrating a device for implementing the method shown in FIG. 7 in accordance with another preferred embodiment of the present invention. Referring to FIG. 8, a first intensity modulator 210 driven by a data signal modulates an output signal of a laser diode 200 acting as a light source into an NRZ signal. The modulated signal generated from the first intensity modulator 210 is re-modulated by a second intensity modulator 220 driven by a clock frequency signal synchronized with the data signal, resulting in an RZ signal. A transmission end polarization controller 240 fixes a polarization direction of the RZ signal to a predetermined angle of 45° with respect to a polarization axis of the PMF 250, and then the RZ signal is applied to the PMF 250. The PMF 250 generates a difference between group velocities due to the polarization, such that each bit is divided into two polarization components and an optical signal generated by delaying only one of the two polarization components by a half bit is acquired as an output signal of the transmission end.

Figure 9:
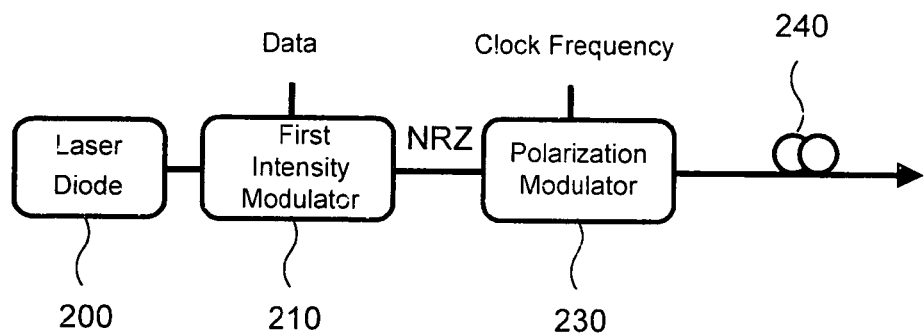
FIG. 9 is a block diagram illustrating a device for implementing the method shown in FIG. 7 in accordance with yet another preferred embodiment of the present invention.

FIG. 9 is a block diagram illustrating a device for implementing the method shown in FIG. 7 in accordance with yet another preferred embodiment of the present invention. Referring to FIG. 9, a first intensity modulator 210 driven by a data signal modulates the output signal of the laser diode 200 acting as a light source into an NRZ signal. A polarization modulator 230 driven by a clock frequency signal synchronized with the data signal performs polarization modulation on the modulated signal received from the first intensity modulator 210, resulting in two polarization components contained in one bit. The transmission end polarization controller 240 controls a polarization direction of the resultant polarization-modulated NRZ signal.

As apparent from the above description, the apparatus and method of the present invention can effectively reduce system deterioration caused by a variety of factors (e.g., a PDG, a PDL, and a PMD). Also, the present invention can effectively prevent a DOP of a signal from being re-increased by the PMD. Furthermore, if a signal undergoes the PMD, the present invention converts an NRZ signal into an RZ signal in association with the signal's waveform, resulting in increased receiver sensitivity and minimized system deterioration.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for reducing system deterioration caused by polarization effects when an optical signal is transmitted to a destination using an optical transmission system having an optical path comprised of fast and slow polarization axes, comprising the steps of:
    a) controlling a transmission end to divide the optical signal into two polarization components orthogonal to each other within one bit before transmitting the optical signal so that a PMD (Polarization Mode Dispersion) can be compensated in the optical path; and
    b) applying one polarization component of the two orthogonal polarization components to the fast polarization axis of the optical path, applying the other polarization component of the two orthogonal polarization components to the slow polarization axis of the optical path, and reducing the influence of the PMD using a predetermined effect indicative of a pulse width reduction caused by the PMD.

2. The method as set forth in claim 1, wherein the step (a) includes the steps of:
    a1) controlling a first intensity modulator driven by a data signal to modulate an output signal of a light source into an NRZ (Non Return to Zero) signal;
    a2) controlling a second intensity modulator driven by a clock frequency signal synchronized with the data signal to modulate the NRZ signal into an RZ (Return to Zero) signal; and
    a3) applying the RZ signal to a component inducing a DGD (Differential Group Delay) corresponding to 30~70% of a period of the data signal at an angle of 45° with respect to a reference polarization axis so that only one polarization component is delayed by 30~70% of the data signal's period.

3. The method as set forth in claim 2, wherein the component inducing the DGD at the step (a3) is indicative of a PMF (Polarization Maintaining Fiber).

4. The method as set forth in claim 1, wherein the step (a) includes the steps of:
    a1) controlling an intensity modulator driven by a data signal to modulate an output signal of a light source into an NRZ (Non Return to Zero) signal; and
    a2) controlling a polarization modulator driven by a clock frequency signal synchronized with the data signal to return the NRZ signal to a signal polarized by a predetermined ratio 30~70% within one bit,
    whereby the output optical signal of the transmission end can simultaneously contain two polarization components within one bit.

5. The method as set forth in claim 1, wherein the step (a) includes the step of:
    performing a signal modulation process, such that one sub-polarization component contained in two orthogonal polarization components (each composed of two sub-polarization components) between nearby bits has the same phase as the other sub-polarization component, and a remaining sub-polarization component contained in the two orthogonal polarization components between nearby bits has a phase opposite to that of a counterpart sub-polarization component of the remaining sub-polarization component.

6. The method as set forth in claim 5, wherein the step (a) includes the steps of:
   a1) controlling a first intensity modulator driven by a data signal to modulate an output signal of a light source into an NRZ (Non Return to Zero) signal;
   a2) controlling a second intensity modulator driven by a clock frequency signal synchronized with the data signal to modulate the NRZ signal into an RZ (Return to Zero) signal;
   a3) controlling a polarization modulator driven by a square or sinusoidal wave corresponding to a half the clock frequency signal to change a polarization direction at intervals of one bit so that individual nearby bits of the RZ signal have polarization states orthogonal to each other; and
   a4) applying individual bits of the RZ signal being polarization-modulated for every bit generated at the step (a3) to a component inducing a DGD (Differential Group Delay) corresponding to 30~70% of a period of the data signal at an angle of 45° with respect to a reference polarization axis, dividing each bit into two polarization components, and delaying only one polarization component of the two polarization components by 30~70% of the data signal period,
   whereby the two polarization components are simultaneously contained in just one bit, one of the two polarization components has the same phase as that of a nearby bit, and the other one has a phase opposite to that of the nearby bit.

7. The method of claim 1, further comprising:
   dividing each bit of the optical signal into a fast polarization axis component and a slow polarization axis component;
   transmitting the slow polarization axis component in the slow polarization axis and the fast polarization axis component in the fast polarization axis of the optical path, the slow polarization axis component being transmitted earlier in time before the fast polarization axis component.

8. An apparatus for reducing system deterioration caused by polarization effects, comprising:
   a transmission end,
   said transmission end including:
      a light source;
      a first intensity modulator driven by a data signal, for modulating an output signal of the light source into an NRZ (Non Return to Zero) signal;
      a second intensity modulator driven by a clock frequency signal synchronized with the data signal, for modulating the NRZ signal received from the first intensity modulator into an RZ (Return to Zero) signal;
      a polarization modulator driven by a signal having a frequency equal to a half a frequency of the clock frequency signal, for modulating the RZ signal received from the second intensity modulator into another signal so that individual nearby bits have polarization components orthogonal to each other;
      a PMF (Polarization Maintaining Fiber) for controlling a polarization direction of the polarization-modulated signal to be equal to an angle of 45° on the basis of its own polarization axis, and generating a difference between group velocities of two orthogonal polarization components; and
      a transmission end polarization controller positioned between the polarization modulator and the PMF, for controlling the polarization direction of the polarization-modulated signal.

9. An apparatus for reducing system deterioration caused by polarization effects, comprising:
   a transmission end,
   said transmission end including:
      a light source;
      a first intensity modulator driven by a data signal, for modulating an output signal of the light source into an NRZ (Non Return to Zero) signal;
      a second intensity modulator driven by a clock frequency signal synchronized with the data signal, for modulating the NRZ signal received from the first intensity modulator into an RZ (Return to Zero) signal;
      a PMF (Polarization Maintaining Fiber) for controlling a polarization direction of the polarization-modulated signal to be equal to an angle of 45° on the basis of its own polarization axis, and generating a difference between group velocities of two orthogonal polarization components; and
      a transmission end polarization controller positioned between the second intensity modulator and the PMF, for controlling a polarization direction of the modulated RZ signal.

* * * * *